(12) United States Patent
Kim

(10) Patent No.: US 11,055,275 B2
(45) Date of Patent: Jul. 6, 2021

(54) DATABASE REVALIDATION USING PARALLEL DISTANCE-BASED GROUPS

(71) Applicant: SAP SE, Walldorf (DE)

(72) Inventor: Jaehwa Kim, Seoul (KR)

(73) Assignee: SAP SE, Walldorf (DE)

( * ) Notice: Subject to any disclaimer, the term of this patent is extended or adjusted under 35 U.S.C. 154(b) by 270 days.

(21) Appl. No.: 15/979,860

(22) Filed: May 15, 2018

(65) Prior Publication Data

US 2019/0354617 A1    Nov. 21, 2019

(51) Int. Cl.
*G06F 16/23*    (2019.01)
*G06F 16/28*    (2019.01)

(52) U.S. Cl.
CPC ........ *G06F 16/2365* (2019.01); *G06F 16/285* (2019.01)

(58) Field of Classification Search
None
See application file for complete search history.

(56) References Cited

U.S. PATENT DOCUMENTS

| 6,374,263 | B1* | 4/2002 | Bunger | G06F 16/24539 |
| 9,231,715 | B2 | 1/2016 | Kim et al. | |
| 2014/0241356 | A1* | 8/2014 | Zhang | H04L 45/745 370/392 |
| 2017/0060989 | A1* | 3/2017 | Shinkuma | H04L 45/02 |
| 2020/0225935 | A1* | 7/2020 | Avgustinov | G06F 8/70 |

* cited by examiner

*Primary Examiner* — Hau H Hoang
(74) *Attorney, Agent, or Firm* — Klarquist Sparkman, LLP

(57) ABSTRACT

Database revalidation may be provided by parallelized execution of distance-based groups. A change to a first data object of the plurality of data objects is received. The first data object has a plurality of dependent data objects in the plurality of data objects. A maximum dependency distance for the respective dependent data objects in the plurality of dependent data objects is calculated. The respective dependent data objects in the plurality of dependent data objects are grouped into one or more groups based on their respective maximum dependency distance. A given group of the one or more groups represents a given maximum dependency distance. The one or more groups are executed on in order from smallest to largest of their respective representations of maximum dependency distance. Executing on the one or more groups includes revalidating the data objects of a respective group in parallel.

20 Claims, 13 Drawing Sheets

US 11,055,275 B2

DATABASE REVALIDATION USING PARALLEL DISTANCE-BASED GROUPS

FIELD

The present disclosure generally relates to database management systems, and applications or systems that perform metadata object processing and filtering. Particular implementations relate to parallelized execution on objects using distance-based grouping, and database metadata object revalidation in parallel.

BACKGROUND

Large databases storing massive amounts of data are increasingly common. Such databases may use varying structures for storing the data, which may use metadata to assist in defining the structures. When such structures or metadata are created or altered, the remainder of the structure may need to be checked or reviewed. However, for massive databases such checking may take a significant amount of time. Thus, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Database revalidation may be provided by parallelized execution of distance-based groups. A change to a first data object of the plurality of data objects is received. The first data object has a plurality of dependent data objects in the plurality of data objects. A maximum dependency distance for the respective dependent data objects in the plurality of dependent data objects is calculated. The respective dependent data objects in the plurality of dependent data objects are grouped into one or more groups based on their respective maximum dependency distance. A given group of the one or more groups represents a given maximum dependency distance. The one or more groups are executed on in order from smallest to largest of their respective representations of maximum dependency distance. Executing on the one or more groups includes revalidating the data objects of a respective group in parallel.

Another process for parallel database revalidation using distance-based groups is provided herein. A root data object, in a database with a plurality of data objects, is identified. A plurality of dependent data objects that depend from the root data object is identified. A maximum distance for the respective dependent data objects of the plurality of dependent data objects is calculated. The respective dependent data objects of the plurality of dependent data objects are grouped into one or more groups, based on their respective calculated maximum distance. The one or more groups are executed on, where the executing includes executing on data objects in a given group in parallel.

A process for parallel data object processing using distance-based groups is provided herein. A root data object having one or more dependent data objects that depend from the root data object is identified. A maximum distance is calculated for the respective one or more dependent data objects from the root data object. The one or more dependent data objects are grouped into one or more groups based on their respective calculated maximum distance. For a given group of the one or more groups, data objects in the given group are processed in parallel. A report on the data object processing is provided.

The present disclosure also includes computing systems and tangible, non-transitory computer readable storage media configured to carry out, or including instructions for carrying out, an above-described method. As described herein, a variety of other features and advantages can be incorporated into the technologies as desired.

The foregoing and other objects, features, and advantages of the invention will become more apparent from the following detailed description, which proceeds with reference to the accompanying figures.

DETAILED DESCRIPTION

Figure 1:
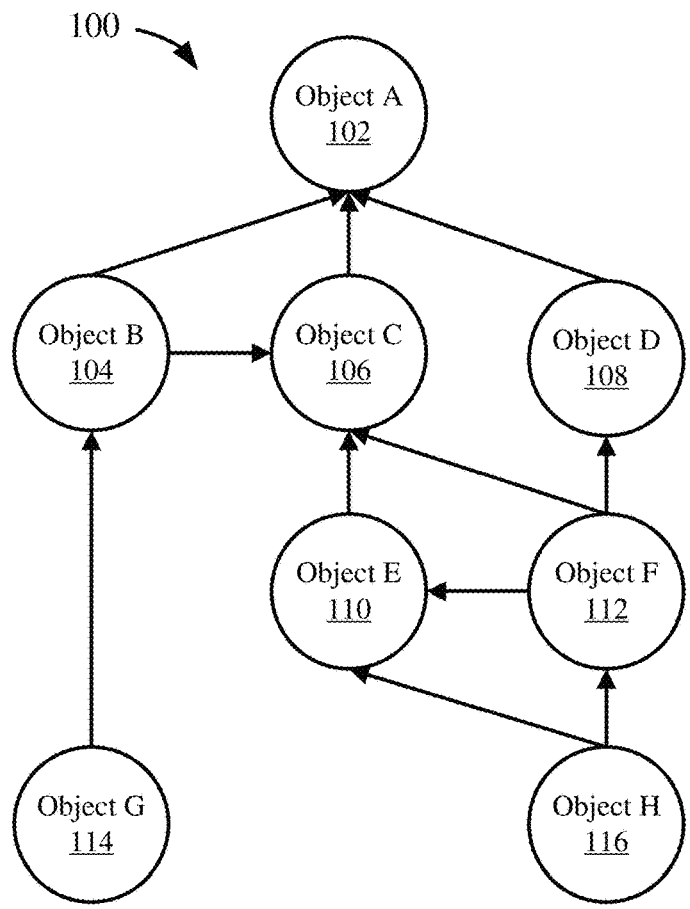
FIG. 1 is a schematic diagram of interrelated data objects.

A variety of examples are provided herein to illustrate the disclosed technologies. The technologies from any example can be combined with the technologies described in any one or more of the other examples to achieve the scope and spirit of the disclosed technologies as embodied in the claims, beyond the explicit descriptions provided herein. Further, the components described within the examples herein may be combined or recombined as well, as understood by one skilled in the art, to achieve the scope and spirit of the claims.

Example 1—Parallelized Processing by Distance-based Groups Overview

A database generally has many data objects, such as tables or views, which are often interrelated. For example, a view may be formed from multiple tables, or a first table may have foreign key dependencies on multiple tables. Massive databases may have hundreds of thousands of data objects which may have interdependencies. Because of these interdependencies, as one data object is changed, other data objects may become invalid or require changes as well. Thus, revalidation (or confirmation of validity) may be necessary when a change is made to a data object.

Here is simple scenario of data object revalidation in a database. A database may have the following data objects (which are generally valid at their time of creation): create table TABLE1 (A int, B int, C int);
create view VIEW1 as select A, B, C from TABLE;
create view VIEW2 as select A, B from TABLE;
create view VIEW3 as select A, B from VIEW1;
create view VIEW4 as select v2.a from VIEW2 v2, VIEW3 v3 where v2.a=v3.a;

The metadata for these data objects may be as follows, which details the data objects interdependencies:
objects: TABLE1, VIEW1, VIEW2, VIEW3, VIEW4
dependency: (VIEW1 references TABLE1), (VIEW2 references TABLE1), (VIEW3 references VIEW1), (VIEW4 references VIEW2), (VIEW4 references VIEW3)

Next, a change may be made to a data object, dropping column C from TABLE1:
alter table TABLE1 drop (C);

After this change is made, i.e. column C is removed from TABLE1, the dependent objects, VIEW1, VIEW2, VIEW3 and VIEW4, may next be revalidated. VIEW1 referenced TABLE's C column but because TABLE's C column is removed, VIEW1 cannot be constructed and is invalidated during revalidation for VIEW1. A validation flag may be set based on this revalidation to indicate that VIEW1 is no longer valid (e.g. the flag may be set to false). Thus, accessing VIEW1 (such as "select * from VIEW1") may generally fail after the change, and so an error message (e.g. "view is invalid") may be provided based on the validation flag rather than attempting to execute a command on the invalid data object. In other cases, effects of a change can be previewed, and a user alerted of objects that might be invalidated by the change. A user can use this information, for example, to decide not to make the change, to make a different change, to update other objects so they are valid after the change, or to remove objects so that other users will not encounter errors.

Continuing with the above example, VIEW2 is still valid because the view is not related with TABLE1's C column. VIEW3 is invalidated because the referencing object, VIEW1, is invalid. VIEW4 is invalidated because the referencing object, VIEW3, is invalid.

Thus, in this example, a root data object (or node) is TABLE1 and VIEW1, VIEW2, VIEW3, and VIEW4 are dependent data objects because they are either directly or indirectly dependent on TABLE1. Further the views are targets for revalidation because of the change to TABLE1. Additionally, as shown in the example, revalidation should generally be performed by dependency order, such that when an object is revalidated, its parent objects have already been revalidated, thus avoiding revalidating an object multiple times as parent objects become revalidated.

Because the dependent data objects should be validated or revalidated in order of dependency, and because interrelated dependencies can be highly complex, generally revalidation is accomplished by forming an ordered list (e.g. a stack, queue, or other data structure) of the data objects based on dependencies (with data objects later in the list, or otherwise lower in a hierarchy, than their parent objects). For example, a breadth-first topological sort may be performed on the dependent data objects to generate the ordered list of dependent data objects for revalidation. However, such an approach can be very time-intensive for massive databases. For example, in implementations where a root data object has 200,000 dependent data objects, revalidation may take ~20 minutes to complete.

A revalidation process that revalidates dependent data objects in parallel while respecting dependency order is provided herein. The parallelized revalidation process gains the advantages of parallel processing of the data objects while maintaining the dependency order such that the data objects do not need to be revalidated multiple times as parent objects are validated.

Further, while the parallel revalidation process may be generally used in database systems for revalidating data objects, the process may also be used outside a database for executing on other types of data objects that are interrelated, or in scenarios with job dependency that can be represented by acyclic graphs. For example, data trees, such as B+ trees, or complex data hierarchies, such as instantiations of interdependent class objects, may benefit from executing updates, recompiles, or other actions on their multitude of data objects using the described parallel revalidation process.

Example 2—Data Object Relationships

FIG. 1 is a schematic diagram of set 100 of interrelated data objects. The interrelated data objects may be data objects in a database, such as tables or views, or other database objects such as procedures, synonyms, sequences, or triggers. Such objects may be metadata objects having metadata regarding the object or the dependencies of the object. Other data objects may include instantiated class objects or any other data objects which may reference or depend from or on each other. Outside a database, the data objects may be nodes in a tree or other hierarchy, or interdependent instantiated data variables or objects.

An object, such as Object A 102, may be a root object. A root object may be an initial object, a top-level object, or an object without dependencies to any other objects in the set 100 of interrelated data objects. A root object, such as Object A 102, may have dependencies to other objects not part of the set 100 of interrelated data objects. In such cases, the other objects upon which the root object depends are generally not part of or relevant to the processing of the set 100 of interrelated data objects.

Objects may have one or more dependencies on other objects in the set 100 of interrelated data objects. Object B 104 may depend on Object A 102 and also depend on Object C 106. Object C 106 may depend on Object A 102. Object D 108 may depend on Object A 102.

Object E 110 may depend on Object C 106, and in this way may depend indirectly on Object A 102. Object F 112 may depend on Object C 106, Object D 108, and Object E 110, and thus indirectly depend on Object A 102.

Object G 114 may depend on Object B 104, and in this way indirectly depend on Object A 102 and Object C 106. Object H 116 may depend on Object E 110 and Object F 112, and in this way in indirectly depend on Object C 106, Object D 108, and Object A 102.

Example 3—Object Processing Based on Dependencies

Figure 2:
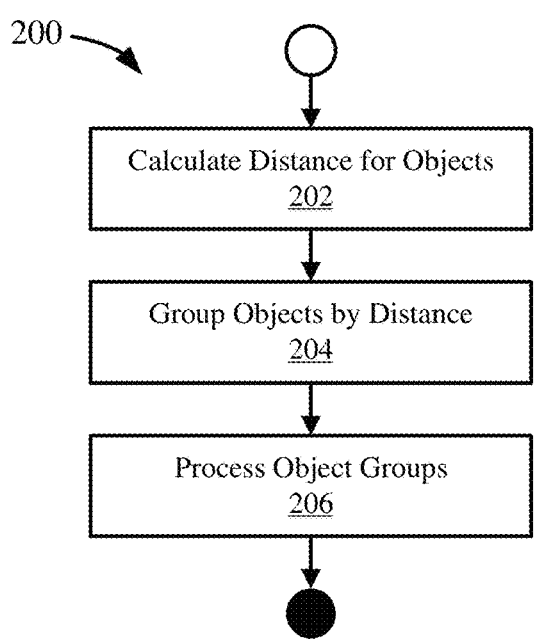
FIG. 2 is a flowchart illustrating a process for executing on interrelated data objects based on dependencies.

FIG. 2 is a flowchart illustrating a method 200 for executing on interrelated data objects based on dependencies, such as processing the data objects in an order determined using information about their dependencies. The process 200 begins, for a set of interrelated data objects such as the set 100 of data objects in FIG. 1, by calculating the distance for the data objects at 202. The distance may generally be calculated from the root data object, such as Object A 102 in FIG. 1. The distance may be the depth of dependencies, or number of intervening dependencies, between a data object and the root data object. A given data object may have multiple different distances depending on the dependency path taken between itself and the root object; generally the distance is the maximum distance between a data object and the root data object.

The data objects are grouped according to their maximum distance at 204. Generally, organizing the data objects into groups having the same maximum distance includes putting references to the data objects (e.g., an identifier, such as a node or object ID) together into a group. Such groupings of references may include lists or arrays, matrices, data maps, vectors, or other data structures that facilitate grouping. In some cases, the grouping may include setting a distance value to the maximum distance for the data objects in the grouping of references, or it may include setting a distance value to the maximum distance which is stored in or with the actual data object (such as in the metadata for the data object). Alternatively, the distance value may be stored in an index housing the data object identifier and dependencies.

Because the data objects are grouped by maximum distance, and each data object can only have one maximum distance, each data object will be in only one group (will not appear in multiple groups). In some cases, the same maximum distance may be calculated through different traversal paths. Further, each data object in a group is not dependent on any other data objects in that group, because they share the same maximum distance. Moreover, data objects in a group with a lower maximum distance are necessarily not dependent on data objects in groups with a higher maximum distance. Thus, grouping by maximum distance ensures that the data objects can be processed based on their dependencies, without needing to know any given object's specific dependencies.

The data objects are then processed by group at 206. Generally, the object groups are processed in ascending order of maximum distance. For example, the object group with a maximum distance of one will generally be processed first, as the data objects in group one will not have dependencies with data objects in the other groups, group two will be processed next, and so on. The data objects in a given object group are also independent of each other, and therefore may be processed in parallel rather than in series. Thus, the object groups may be processed in series while the separate data objects in each group may be processed in parallel. In this way, the data objects may be processed in parallel while still accounting for their interdependencies.

By grouping the data objects based on maximum distance, the dependencies between the data objects are respected while still allowing for parallel processing of the data objects. The distance-based groups identify which data objects are known to be independent of each other and can thus be processed in parallel. Processing the groups in ascending order from smallest maximum distance to largest then ensures that, for any given data objects, its parent objects have already been processed. Thus ensuring efficient processing of all data objects by processing each data object only once.

Traversal and processing of the data objects may be accomplished by accessing the data objects themselves, or by accessing indexes or system tables (or other system resources) that represent the data objects or maintain metadata for the data objects (e.g. dependency information).

In some scenarios, pruning may be done on the group of data objects to reduce the number of data objects for processing. Such pruning may be accomplished at any stage in the process 200, as befits the pruning criteria and process used.

Example 4—Data Object Distance Calculation

Figure 3A:
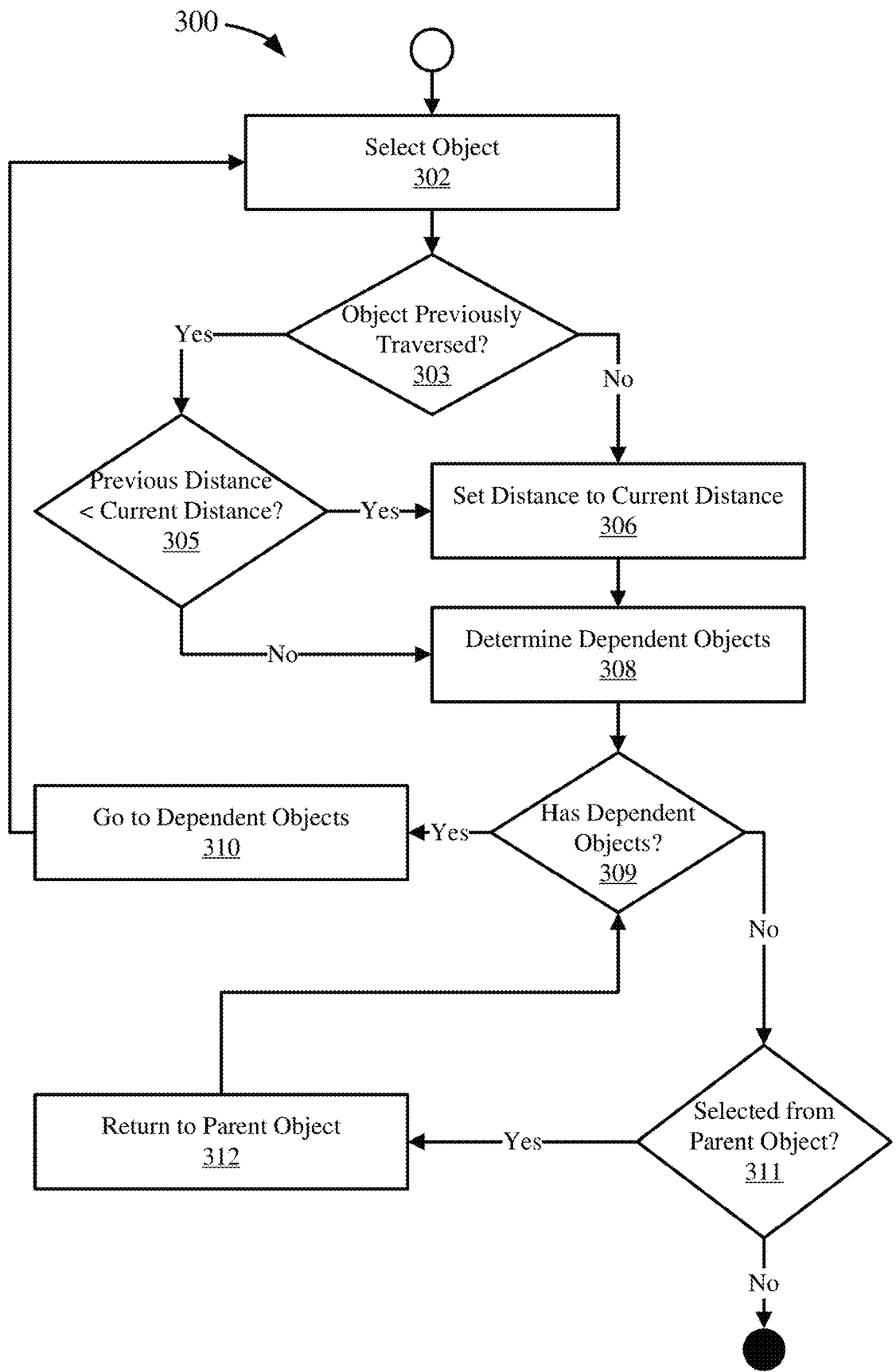
FIG. 3A is a flowchart illustrating a process for calculating data object distance.

FIG. 3A is a flowchart illustrating a process 300 for calculating data object distance. The process 300 may be a depth-first traversal of the set 100 of interrelated data objects shown in FIG. 1. Thus, the process 300 may generally traverse the depth of the dependencies for a given dependent object first, before moving to the next dependent object of the root object.

A data object is selected at 302. This may be a root data object, such as Object A 102 shown in FIG. 1, in the first iteration or pass of the process 300 (i.e. when the process 300 first begins). When the process 300 begins and selects the root data object at 302, the depth is known to be zero, as the root data object either has no dependencies, or has no relevant dependencies.

The data object selected at 302 may be checked to determine if it was previously traversed at 303. This determination may be made by checking a distance value for the selected data object; if the distance value is null (or not yet set), then it has not been traversed previously, whereas if the distance value is not null (has a value), then the data object has been traversed previously. Other implementations may use a traversal flag, or may implicitly or programmatically test the data object, such as by maintaining separate previous and current distance variables in addition to the data object's distance variables.

If the data object was not previously traversed ("no" at 303), then the distance for the data object is set to the current distance at 306. For the root data object on the first pass of the process 300, this will be zero. If the data object was previously traversed ("yes" at 303), then the larger value between the previous distance and current distance is determined at 305. If the previous distance is less than the current distance ("yes" at 305), then the data object's distance is set to the current distance at 306. If the previous distance is not less than the current distance ("no" at 305), then the distance for the data object does not change.

Dependent objects for the selected data object are determined at 308. This may include searching an index, or a metadata structure or index, for data dependencies. Any dependent data objects found may be provided in a list having the references to the dependent data objects. If the selected data object has been traversed before, there may already be a list of its dependent data objects.

The set of dependent data objects determined at 308 is checked at 309. If the selected object has one or more dependent data objects that have not yet been traversed from the currently selected data object ("yes" at 309), then the process 300 examines the dependent data objects at 310. Examining the dependent data objects may include a programmatic change of scope or moving to the dependent data objects, or may include incrementing or increasing the current distance.

A dependent data object is then selected (becoming the selected data object) at 302. This selection may be made arbitrarily between the available dependent data objects, or it may be made based on other factors. For example, in some database systems, object identifiers (e.g. oid) may be incrementally given to objects as they are created; in such cases, a dependent object will necessarily have a higher object identifier than its parent object. Thus, when selecting the next dependent object in such database systems, the order of selection may be in ascending order, which may help avoid re-visiting data objects. Additionally, data objects may be skipped (e.g. not read or analyzed) and not selected if they have a distance value that is greater than or equal to the current distance (in such cases, the skipped dependent data object would already have been examined, including its own dependent data objects, because it already has a calculated distance).

If the selected data object has no dependent data objects, or has no dependent data objects that have not yet been traversed through the selected data object, ("no" at 309), then the selected data object is checked for a parent object at 311. This check is to determine if there is a higher programmatic scope (e.g., an object at a higher hierarchical level than the current object), or additional dependent data objects at the same level as itself (e.g., by traversing back to the parent object to look for sibling objects of the current object), still remain. If the selected data object has a parent data object ("yes" at 311), then the process 300 returns to the parent data object at 312. Going to the parent data object may include a programmatic change of scope, or may include decrementing or lowering the current distance. The parent data object is then checked for further dependent data objects that have not yet been traversed at 309, as described herein.

If the selected data object does not have a parent data object ("no" at 311), then the process 300 is complete and all dependent data objects from the root data object have been traversed and their distance calculated and set. Not having a parent data object may include identifying the original root data object for the given change, which may or may not have an actual parent data object (e.g. dependency) that is outside the scope of the current process (e.g., the root node has an external reference that is not of importance for the distance calculation).

Example 5—Example Distance Calculation with Data Objects

Figure 3B:
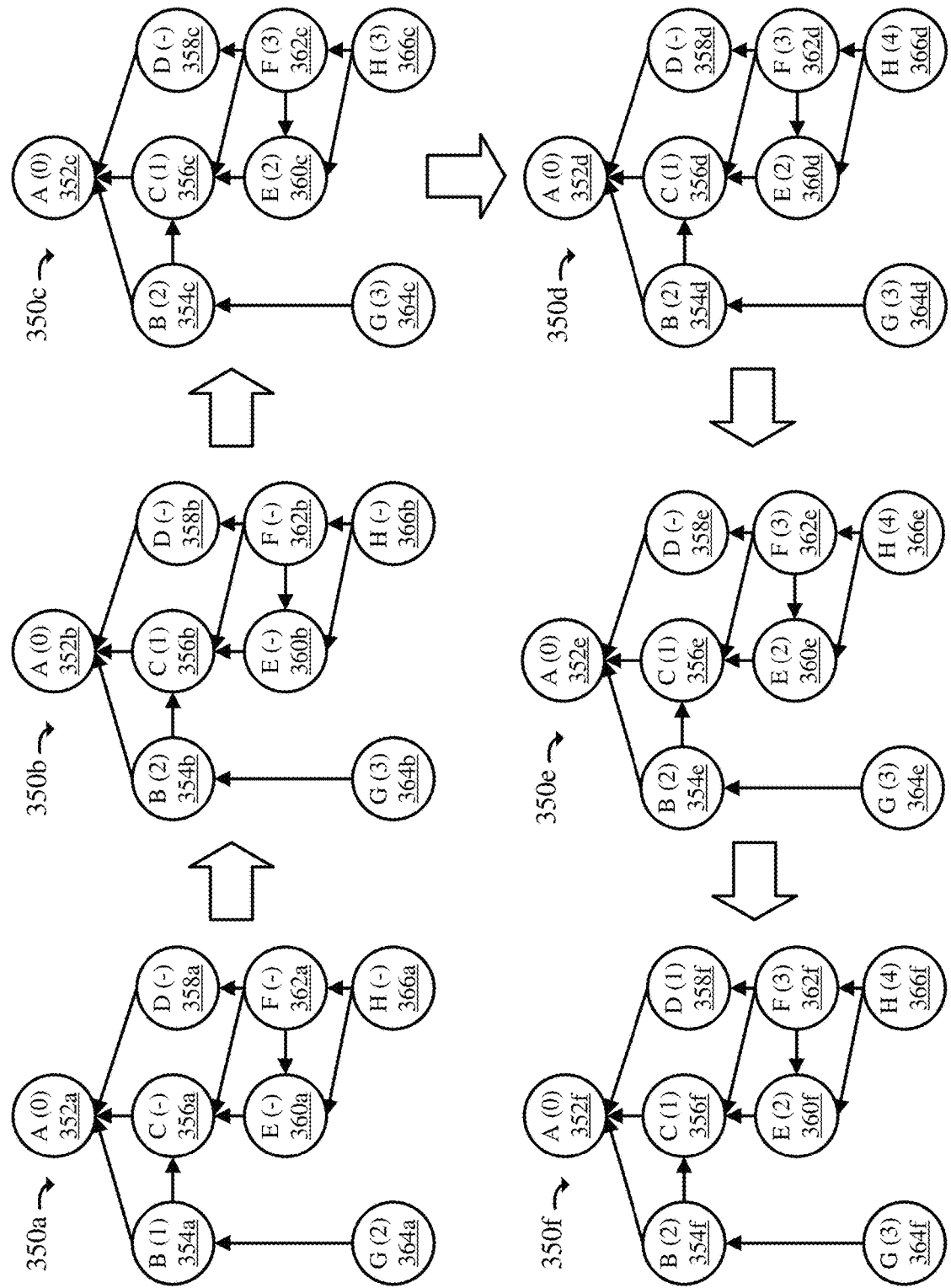
FIG. 3B is a diagram showing an example distance calculation by iteration of a set of interrelated data objects.

FIG. 3B is a diagram showing an example distance calculation by iterating through a set of interrelated data objects. The example set of interrelated data objects is the set 100 shown in FIG. 1. The example depicts a depth-first traversal of the data object dependency hierarchy across iterations 350*a-f* of the traversal.

In the first pass 350*a* of the distance calculation, object A 352*a* is traversed and its distance is set to zero. Object B 354*a* is then traversed based on its dependency with object A 352*a*, and its distance is set to 1. Object G 364*a* is then traversed based on its dependency with object B 354*a*, and its distance is set to 2. Object C 356*a*, object D 358*a*, object E 360*a*, object F 362*a*, and object H 366*a* have not yet been traversed, and so have no set distance yet.

In the second pass 350*b* of the distance calculation, object A 352*b* has a distance set to zero, as determined from the first pass 350*a*. Object C 356*b* is traversed based on its dependency with object A 352*b*, and its distance is set to 1. Object B 354*b* is then traversed based on its dependency with object C 356*b*, and its distance is set, or updated, to 2 (because 2 is greater than 1). Object G 364*b* is then traversed based on its dependency with object B 354*b*, and its distance is set, or updated, to 3 (because 3 is greater than 2). Object D 358*b*, object E 360*b*, object F 362*b*, and object H 366*b* have not yet been traversed, and so have no set distance yet. Objects B 354*b* and G 364*b* were updated because the new distance is greater than the previous distance; thus, the distance for each object will be the maximum distance from the root object.

In the third pass 350*c* of the distance calculation, object A 352*c* has a distance set to zero. Object E 360*c* is traversed based on its dependency with object C 356*c*, and its distance is set to 2. Object F 362*c* is traversed based on its dependency with object E 360*c*, and its distance is set to 3. Object H 366*c* is traversed based on its dependency with object E 360*c*, and its distance is set to 3. Object H 366*c* and object F 362*c* may be traversed in either order. Object B 354*c* is not traversed and its distance remains 2. Object G 364*c* is not traversed and its distance remains 3. Objects B 354*c* and object G 364*c* are not traversed as they were already traversed as dependent objects from object C 356*c* in the second pass 350*b*. Object C 356*c* is not traversed and its distance remains 1. Object D 358*c* has not yet been traversed, and so have no set distance yet.

In the fourth pass 350*d* of the distance calculation, object A 352*d* has a distance set to zero. Object H 366*d* is traversed based on its dependency with object F 362*d* through its dependency with object E 360*d*, and its distance is set, or updated, to 4, being the larger distance. Object F 362*d* was just traversed based on its dependency with object E 360*d* in iteration 350*c*, and so need not be traversed again here. Object B 354*d* is not traversed and its distance remains 2. Object G 364*d* is not traversed and its distance remains 3. Object C 356*d* is not traversed and its distance remains 1. Object E 360*d* is not traversed and its distance remains 2. Object D 358*d* has not yet been traversed, and so has no set distance yet.

In the fifth pass 350*e* of the distance calculation, object A 352*e* has a distance set to zero. Object F 362*e* is traversed based on its dependency with object C 356*e*, and its distance is not set to 2 (its distance from object A 352*e* through object C 356*e* directly), but remains at 3, because this is the larger distance. In some cases, object F 362*e* may be skipped and further traversal not performed based on the lower distance calculation. Object H 366*e* is traversed based on its dependency with object F 362*e*, and its distance is not set to 3 (its distance from object A 352*e* through object C 356*e* and the object F 362*e*), but remains at 4, because this is the larger distance. Object B 354*e* is not traversed and its distance remains 2. Object G 364*e* is not traversed and its distance remains 3. Object C 356*e* is not traversed and its distance remains 1. Object E 360*e* is not traversed and its distance remains 2. Object D 358*e* has not yet been traversed, and so have no set distance yet.

In the sixth pass 350*f* of the distance calculation, object A 352*f* has a distance set to zero. Object D 358*f* is traversed based on its dependency with object A 352*f*, and its distance is set to 1. Object F 362*f* is traversed based on its dependency with object D 358*f*, and its distance is not set to 2 (its distance from object A 352f through object D 358f directly), but remains at 3, because this is the larger distance. In some cases, object F 362f may be skipped and further traversal not performed based on the lower distance calculation. Object H 366f is traversed based on its dependency with object F 362f, and its distance is not set to 3 (its distance from object A 352f through object D 358f and the object F 362f), but remains at 4, because this is the larger distance. Object B 354f is not traversed and its distance remains 2. Object G 364f is not traversed and its distance remains 3. Object C 356f is not traversed and its distance remains 1. Object E 360f is not traversed and its distance remains 2.

After the sixth iteration completes, each object has been traversed and through the various routes available between it and the root object, and the distance for each object accordingly calculated and set. Thus, object A 352a-f has a maximum distance of zero, object B 354a-f has a maximum distance of 2, object C 356a-f has a maximum distance of 1, object D 358a-f has a maximum distance of 1, object E 360a-f has a maximum distance of 2, object F 362a-f has a maximum distance of 3, object G 364a-f has a maximum distance of 3, and object H 366a-f has a maximum distance of 4.

Example 6—Data Object Distance-Based Groups

Figure 4:
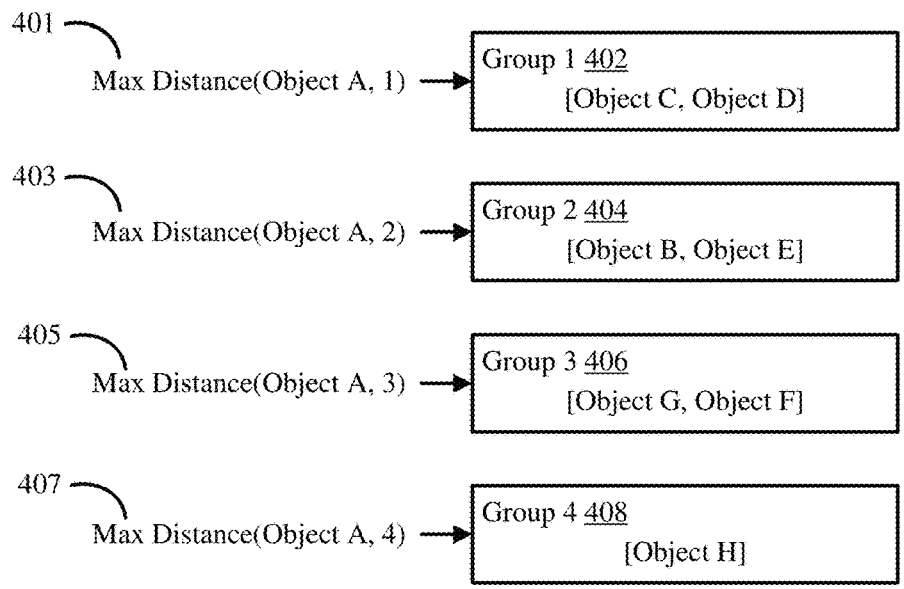
FIG. 4 is a diagram depicting distance-based groupings.

FIG. 4 is a diagram depicting distance-based groupings. The data objects depicted may be the data objects from the set 100 of interrelated data objects in FIG. 1. The grouping may be carried out as part of step 204 of process 200 shown in FIG. 2. The distances may be calculated as shown in FIGS. 3A-B, such as using depth-first traversal, or from some other dependency distance calculation method. Using the example shown in FIG. 3B, the groups can include:

Data objects with a maximum distance of 1 from Object A 401 may form Group 1 402. Group 1 402 may include Object C and Object D.

Data objects with a maximum distance of 2 from Object A 403 may form Group 2 404. Group 2 404 may include Object B and Object E.

Data objects with a maximum distance of 3 from Object A 405 may form Group 3 406. Group 3 406 may include Object G and Object F.

Data objects with a maximum distance of 4 from Object A 407 may form Group 4 408. Group 4 408 may include Object H. No other groups are formed, as distance 4 is the largest maximum distance calculated for the set of interrelated data objects from Object A.

The groups 1-4 402, 404, 406, 408 may be formed either explicitly (having a group identifier or other attribute indicating a group) or implicitly (having the maximum distance value without directly identifying a defined group). The groups 1-4 402, 404, 406, 408 may be formed using a data structure or variable such as a matrix, a data map, an array or array of arrays, linked variables, an STL vector, or others. Such variables may store a reference to the data object, such as a pointer or name Such variables may further store a maximum distance value for the data objects, or may associate the data object references together into groups (e.g. an array of groups having group identifiers, each group having an array of data object references), or may store both (e.g. a group identifier and a maximum distance value). A data object reference and a group identifier or a maximum distance may form a set. The group identifier or maximum distance may be metadata attributes for the data objects.

As another example, the groups may be represented as follows:
Group list=[
Group1={distance=1, objects=[c, d]},
Group2={distance=2, objects×[b, e]},
Group3={distance=3, objects[g, f]},
Group4={distance=4, objects=[h]},
]

Generally, data objects in the same group do not have dependencies between each other, as they have the same maximum distance. In some cases, data objects in one object group may be dependent upon other data objects in a different object group. Generally, objects in one group may only be dependent on objects in a group with a lower maximum distance. Further, because the groups are formed based on the maximum distance for data objects, each data object will only be in one group, as no object can have more than one maximum distance.

Example 7—Pseudo Code for Distance Calculation and Grouping

In some scenarios, the distance calculation and grouping may be performed together. A pseudo code example for calculating the maximum distance of data objects based on dependency and grouping (in a distance map) the data objects together is as follows: Function calculateMaxDistance (ObjectID rootObjectId)

@return: object distance map which key is object ID and value is maximum distance

```
01. prepare distanceMap where the key is object ID and the value is distance.
02. prepare stack and, push {'objectID': rootObjectId, 'distance': 0} onto stack
03. While stack is not empty:
04.     stackData = stack.pop( )
05.     distanceOfDependentObject = stackData.distance + 1
06.     dependentObjectIDList = getDependentObjects(stackData.ObjectID) //search the existing index
07.     For each dependentObjectID in dependentObjectIDList:
08.         previousDistance = 0
09.         If dependentObjectID exists in distanceMap:
10.             previousDistance = distanceMap[dependentObjectID]
11.         Else:
12.             add {'key': dependentObjectID, 'value': 0} into distanceMap
13.         If previousDistance < distanceOfDependentObject:
14.             distanceMap[dependentObjectID] = distanceOfDependentObject //update distance value in map
15.         push {'objectID': dependentObjectID, 'distance': distanceOfDependentObject} onto stack
16. return distanceMap
```

Thus, this example performs a depth-first traversal of the data objects, while calculating the objects' distances and placing the object ID (a reference to the object) and its associated distance into a data map. If a larger distance is calculated during the traversal for a given data object, the distance for that data object is updated in the data map. In this way, the data map has both the maximum distance calculations and the groupings of the data objects (the data objects can be retrieved in a group by searching on the distance value rather than the object ID value).

Example 8—Execution on an Object Group

Figure 5:
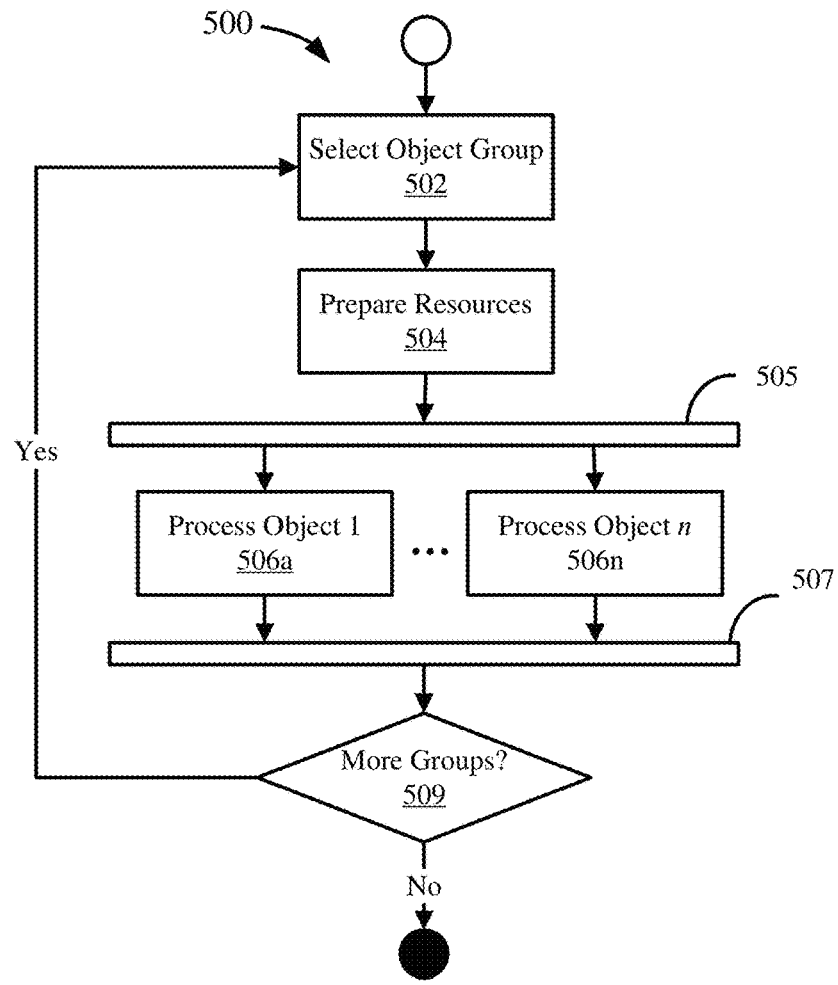
FIG. 5 is a flowchart illustrating a process for executing on data objects in parallel from an object group.

FIG. 5 is a flowchart illustrating a process 500 for executing on data objects in parallel from an object group.

The process 500 may be performed as part of step 206 in process 200 as shown in FIG. 2.

An object group is selected at 502. Generally, the object group is selected from a set of object groups and is an object group that has not yet been selected (or processed). As described herein, the object group may be a distance-based group where the data objects in the group have the same maximum distance from a root data object. Because the objects in the group have the same maximum distance based on dependencies from a root object, none of the objects in the group are interdependent (or, put another way, the objects are independent of each other), thus allowing the objects to be processed in parallel.

In some cases, one or more objects in an object group may be dependent upon other objects in a different object group. In such cases, it may be important to process the object groups in an order that considers these dependencies. Thus, the object groups may be selected from the smallest maximum distance object group first to the largest maximum distance group last, as less distant objects cannot be dependent on more distant objects (while the reverse may not be true).

Resources for processing the objects in the selected object group are prepared at 504. Preparing resources may include determining a number of resources needed, or the type of resources needed. For example, a separate thread may be needed for each object in the object group, thus a number of threads equal to the group size of the selected object group may be prepared. The type of resources or number of resources needed may vary depending on the data objects being processed. For example, if the data object being processed is a large set of records or a database segment, a computing resource may be prepared or allocated, which may have a set of threads or processors.

As the resources are prepared at 504, the resources may be allocated to run in parallel 505. The parallel resources may be allocated to separate data objects; for example, each allocated thread may receive a separate data object for processing in parallel. Thus, each data object in the selected object group is processed or executed on at steps 506*a-n*. The processing of each data object may begin as soon as the prepared resource is allocated, and need not wait for each resource to be prepared and allocated. For example, executing on Object 1 at 506*a* may begin as soon as the resource for object 1 is ready and allocated, while the resource for executing on object n at 506*n* may not yet be ready. Thus, the executing on each data object may be parallelized and may begin as early as the resources are available to further improve the execution performance time.

Processing or executing on data objects at 506*a-n* may include performing actions or calculations on the data objects, such as revalidating, recompiling, updating, transferring to other data storage (e.g. backup), calculating results from queries or analyses, or other such actions.

As the execution steps for the data objects 506*a-n* are completed, the parallelization closes at 507. Once all the separate process steps 506*a-n* are complete, the process 500 determines if additional object groups require processing at 509. If there are remaining object groups ("yes" at 509), the next object group is selected at 502. Generally, the next object group selected will be the object group with the next lowest maximum distance. If there are no remaining object groups for processing ("no" at 509), then execution on all object groups, and hence all objects, has been completed.

Example 9—Database Revalidation Process

Figure 6:
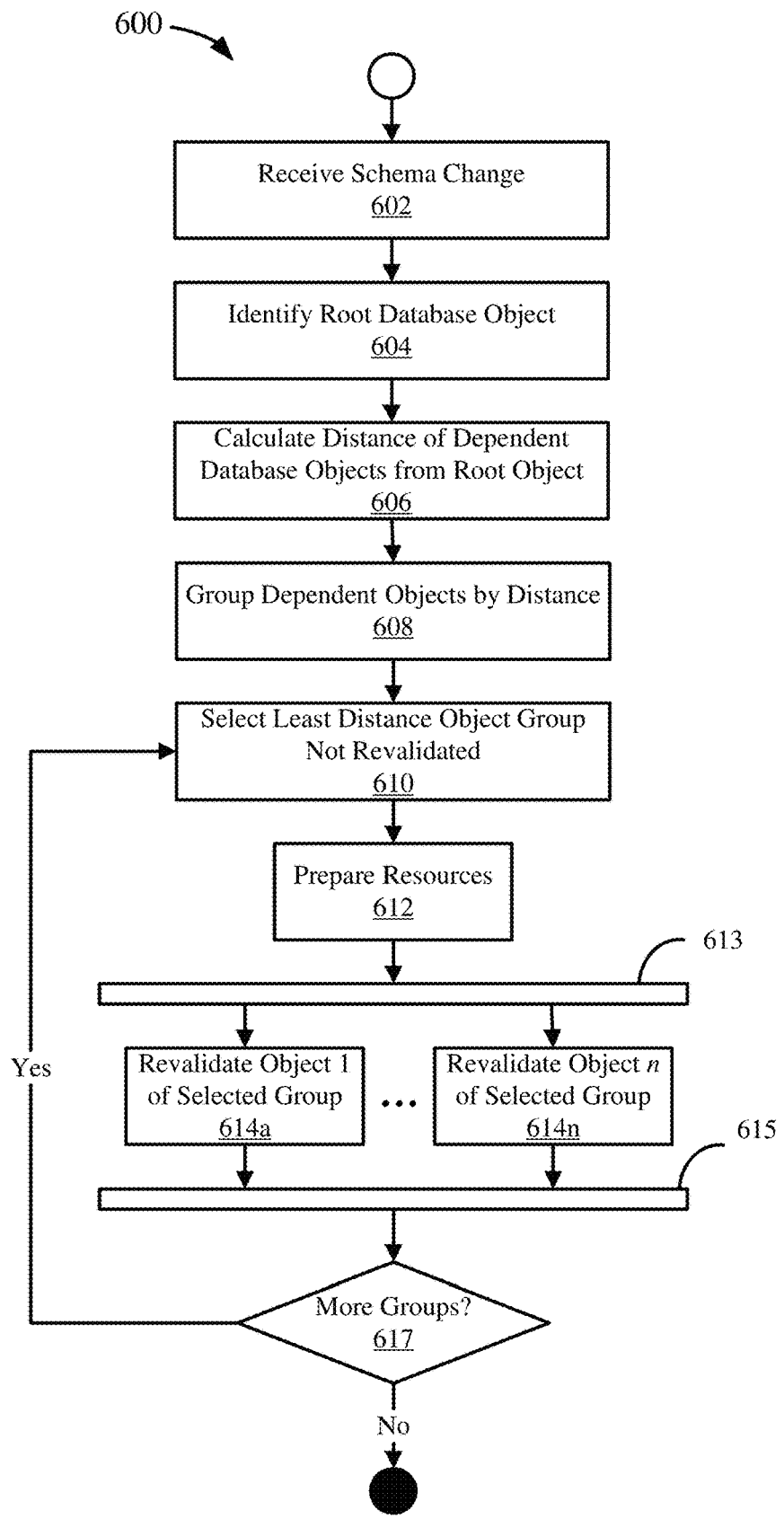
FIG. 6 is a flowchart illustrating a process for revalidating database data objects in parallel using distance-based groups.

FIG. 6 is a flowchart illustrating a process 600 for revalidating database data objects in parallel using distance-based groups. The process 600 may be performed in a database management system, and may be implemented to run automatically when a data object is altered, removed, or added, or may run upon command from a user, such as a database administrator.

A schema change is received at 602. The change may include altering a data object, or dropping or creating a data object, such as a table or view. Generally, the received change will be completed at 602 as well, such that the remaining steps of the process 600 will then work with the changed hierarchy of data objects. However, in some cases the change may not be completed at 602, and the remaining steps of the process 600 may continue as if the change was implemented. Such a scenario may include temporary data objects or data references that indicate the received change, and may allow for determining the potential revalidation results before completing a change. In other embodiments, 602 can be a command from a user to execute the revalidation process 600.

The root database object may be identified at 604. The root database object may generally be the root data object in the database that is relevant to the schema change. In some cases, this may be the overall root data object in the database, thus necessitating that the entire database is revalidated. In other cases, the root data object may be the data object that was changed in the schema change; for example, when only one data object is changed, the changed data object may be identified as the root data object for the revalidation. In other cases, such as when multiple data objects were changed as part of the schema change, it may be the data object that is ultimately related to (e.g. is the root data object for) all the changed data objects. As an alternative when multiple data objects are changed in the schema change, the changed data objects that are not related to each other may be treated separately in separate revalidation processes.

The maximum distances of all data objects that are dependent on the identified root data object are calculated at 606. The maximum distance is of the data object dependencies from the identified root data object, as described herein. The calculation may use a depth-first traversal of the dependent data objects to calculate the distance.

The dependent data objects are grouped by their maximum distance at 608. The dependent data objects may be grouped as described herein, such as by simply setting a maximum distance value for the data object, or by storing references and maximum data values in a variable, such as a matrix or data map. Such variables may also or alternatively include explicit groups, having a group identifier, with references to the data objects.

The object group with the smallest or least distance from the root data object is selected at 610. Generally, this is an object group that has not yet been revalidated. The smallest maximum distance object group is generally selected first, as this object group has no dependencies with objects in other object groups, because the distance is a measure of dependencies. Thus, the smallest maximum distance object group may be revalidated without considering dependencies on other data objects that depend ultimately from the identified root data object.

Resources for processing the objects in the selected object group are prepared at 612. This may include determining a number of resources needed, or the type of resources needed. For example, a separate thread may be needed for each object in the object group, thus a number of threads equal to the group size of the selected object group may be prepared. The type of resources or number of resources needed may vary depending on the data objects being processed. For example, if the data object being processed is a large set of records or a database segment, a computing resource may be prepared or allocated, which may have a set of threads or processors.

As the resources are prepared at 612, the resources may be allocated to run in parallel 613. The parallel resources may be allocated to separate data objects from the selected object group; for example, each allocated thread may receive a separate data object (a reference to the data object) for processing in parallel. Thus, each data object in the selected object group is revalidated at 614a-n.

The revalidation of each data object may begin as soon as the prepared resource is allocated, and need not wait for any other resource to be prepared and allocated. For example, executing on Object 1 at 614a may begin as soon as the resource for object 1 is prepared and allocated, while the resource for executing on object n at 614n may not yet be ready. Thus, the executing on each data object may be parallelized and may begin as early as the resources are available to further improve the execution performance time.

Revalidating the data objects of the selected object group at 614a-n may include checking or testing all dependencies of the data object to determine if any dependencies now fail; for example, if the target object of a dependency no longer exists or is now incompatible, or a field name or variable that is part of the dependency no longer exists or is changed in an incompatible way. A validation flag may be set as part of the metadata for the data object during revalidation. A revalidation time/date stamp may also be set in place of or in addition to a revalidation flag. Revalidation may include recompiling the data object or changing the data object as necessary for it to be valid. In some scenarios, revalidation may include re-running any queries or other procedures that define, at least in part, the data object. For example, a materialized view may be revalidated, at least in part, by running the view query and obtaining the results.

In one example, a validity flag may be set based on the revalidation testing. The following data objects may be part of revalidation:
create table TABLE1 (A int, B int, C int);
create view VIEW1 as select * from TABLE1;
If TABLE1 is dropped (drop table TABLE1;), VIEW1's validity flag may be changed from 'valid' to 'invalid' during revalidation.

In another example, a view may be changed during revalidation based on a change to a parent object. The following data objects may be part of revalidation:
create table TABLE2 (A int, B int, C int);
create view VIEW2 as select * from TABLE2;
If column C in TABLE2 is changed to type string from type int, VIEW2's column C may be changed to type string during revalidation, based on the change and dependency with column C in TABLE2. Thus, VIEW2 remains valid rather than being invalidated during revalidation. However, an object associated with VIEW2 can be given a timestamp or other indicator indicating that VIEW2 was revalidated.

In a further example, revalidation may determine that the data object remains valid and so no change, either to the data object or its metadata, need be made. The following data objects may be part of revalidation:
create table TABLE3 (A int, B int, C int);
create view VIEW3 as select A, B from TABLE3;
If an additional column is added to TABLE3 (e.g. alter table TABLE3 add (D int);), VIEW3 remains unaffected by the change. Thus, during revalidation of VIEW3, no specific action need be taken. In some cases, a timestamp or other indicator may be set to indicate that the data object was revalidated while no changes were made.

As the revalidation for the data objects 614a-n are completed, the parallelization closes at 615. Once all the separate revalidation steps 614a-n are complete, the process 600 determines if additional object groups require revalidation at 617. If there are remaining object groups ("yes" at 617), the next object group is selected at 610. Generally, the next object group selected will be the object group with the next lowest maximum distance. If there are no remaining object groups for processing ("no" at 617), then execution on all object groups, and hence all objects, has been completed.

A revalidation report may be provided after the revalidation process 600 has completed. Such a report may include one or more of the schema change, the identified root data object, the object groups, with their respective data objects and calculated maximum distances, the results of the revalidations (such as the flag), or any error messages or other notices from revalidation. A report may be predicated on a revalidation flag, or the results of the revalidation. Further, access to the data objects, such as through a query or by a user, may be predicated on a validity or revalidation indicator as set during revalidation.

In some embodiments, the maximum distance calculations or the maximum distance groupings may be stored or maintained. In such cases, it may not be necessary to calculate new maximum distances or form new groups before revalidating the data objects in the database. For example, a received schema change at 602 may be identified as not making a change to the hierarchy of dependent data objects from the root data object (as identified at 604). In such cases, the process 600 may re-use the previously calculated maximum distances, skipping the step 606, if the maximum distance was saved. Additionally or alternatively, if the groups were saved and there was no change to the hierarchy of dependent data objects, the distance calculation step 606 and the grouping step 608 may be skipped, as the groups remain formed. In general, however, such embodiments may require identifying that no other changes to the dependent data object hierarchy, outside the received schema change at 602, were made.

Example 10—Environments for Parallelized Execution on Data Objects

Figure 7A:
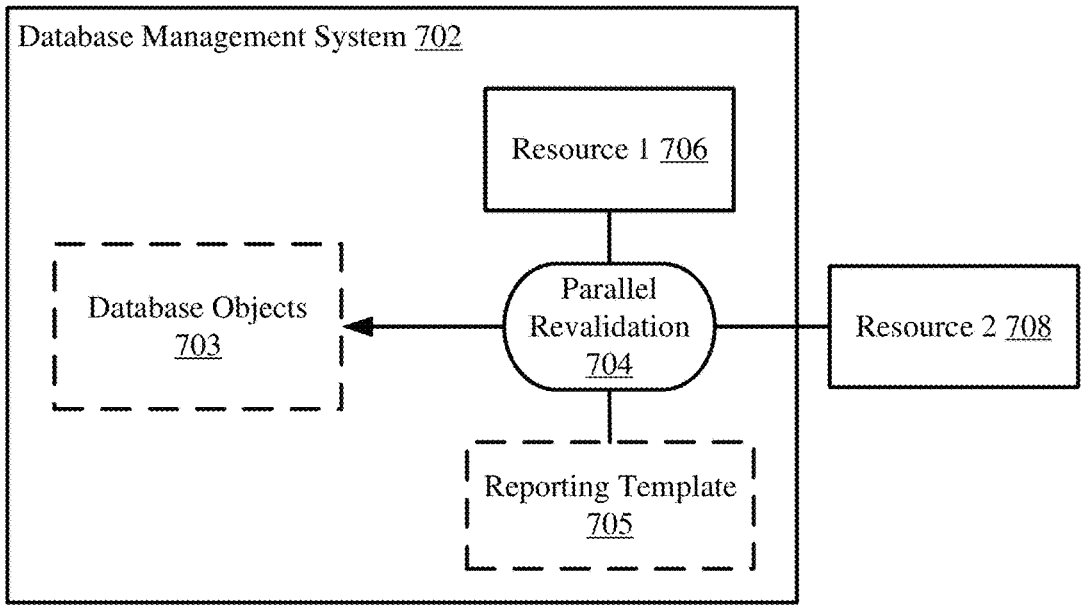
FIG. 7A is an architecture diagram depicting a parallel revalidation process in a database.

FIG. 7A is an architecture 700 depicting a parallel revalidation process in a database. A database management system 702 may have a set of database objects 703 which form the database. The database objects 703 are generally interrelated, with some objects depending from other objects. The database objects 703 may be tables, views, procedures, synonyms, sequences, triggers, or other database objects. Generally, such database objects may have metadata, which may store information about their respective dependencies.

The database management system 702 may have a parallel revalidation procedure 704, as described herein. Such a revalidation procedure 704 may be parallelized using distance-based object groups. The parallel revalidation procedure 704 may revalidate or otherwise execute on the database objects 703. The parallel revalidation procedure 704 may also provide reports or other information concerning the revalidation and status of the database objects 703 it processes.

The parallel revalidation procedure 704 may have one or more reporting templates, such as Reporting Template 705, for providing the results of revalidation (e.g. generating reports). A reporting template 705 may include error messages for the revalidation procedure 704 or for individual data objects within the revalidation, or may include summary data for the revalidation procedure or individual data objects within the procedure. A reporting template 705 may provide such reporting information through a user interface (e.g. display) or may output the reporting information in a log file.

The parallel revalidation procedure 704 may have access to multiple additional resources for performing the revalidation, such as Resource 1 706 or Resource 2 708. Such resources may be available within the database management system 702, such as resource 1 706, or may be outside the database management system, such as resource 2 708. The resources may be remote computing resources, or may be threads or CPUs available for processing.

One example database system that may be improved by implementing the database revalidation and parallel processing techniques described herein is SAP HANA™ of SAP SE of Walldorf, Germany.

Figure 7B:
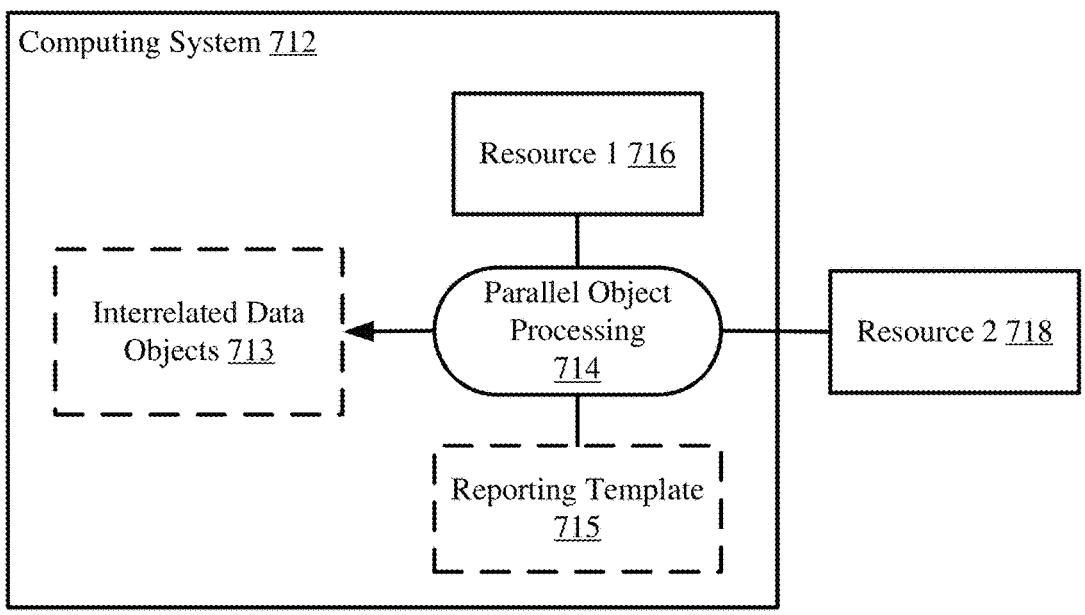
FIG. 7B is an architecture diagram depicting a parallel process for executing on interrelated data objects in a computing system.

FIG. 7B is an architecture 710 depicting a parallel process for executing on interrelated data objects in a computing system. A computing system 712 may have a set of interrelated data objects 713. The interrelated data objects 713 generally have some objects depending from other objects. The interrelated data objects 713 may be instantiated class objects, leaf-node trees, such as B or B+ trees, linked instantiated variables, or other data objects with dependencies. Such data objects may have metadata, which may store information about their respective dependencies.

The computing system 712 may have a parallel object processing procedure 714, as described herein. Such an object processing procedure 714 may be parallelized using distance-based object groups from the data object dependencies. The parallel object processing procedure 714 may execute on the interrelated data objects 713, such as recompiling, validating, updating, restructuring, or otherwise using the data objects. The parallel object processing procedure 714 may also provide reports or other information concerning the execution and status of the interrelated data objects 713 it processes.

The parallel object processing procedure 714 may have one or more reporting templates, such as Reporting Template 715, for providing the results of object processing (e.g. generating reports). A reporting template 715 may include error messages for the object processing procedure 714 or for individual data objects within the object processing, or may include summary data for the object processing procedure or individual data objects within the procedure. A reporting template 715 may provide such reporting information through a user interface (e.g. display) or may output the reporting information in a log file. In some aspects, an error message can be generated when an invalid object is detected, or when an attempt is made to access an invalidated object.

The parallel object processing procedure 714 may have access to multiple additional resources for performing the processing, such as Resource 1 716 or Resource 2 718. Such resources may be available within the database management system 712, such as resource 1 716, or may be outside the database management system, such as resource 2 718. The resources may be remote computing resources, or may be threads or CPUs available for processing.

Example 11—Additional Processes for Executing on Data Objects

Figure 8A:
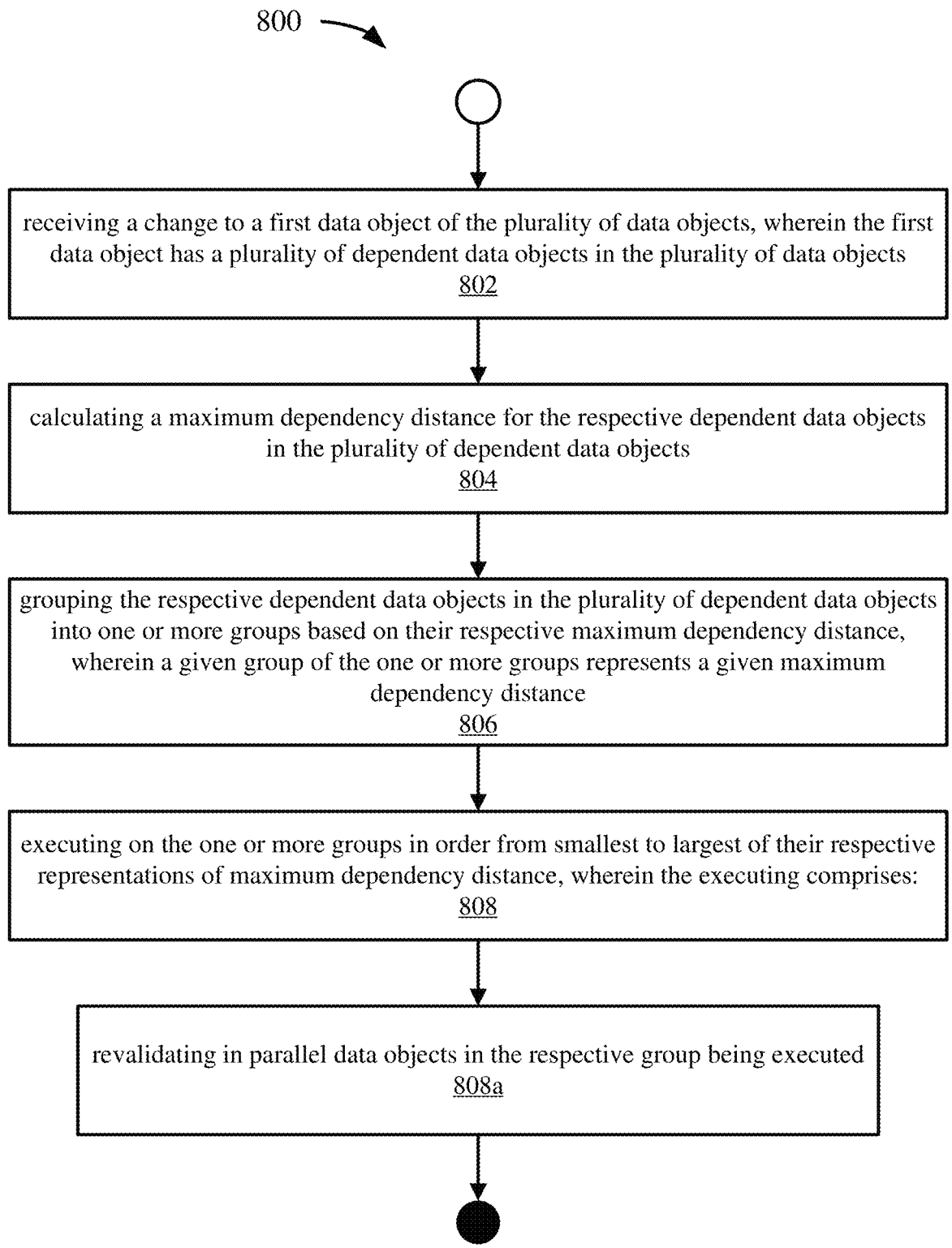
FIG. 8A is a flowchart illustrating a process for parallel database revalidation using distance-based groups.

FIG. 8A illustrates a process 800 for parallel database revalidation using distance-based groups. A change to a first data object of the plurality of data objects is received at 802. The first data object has a plurality of dependent data objects in the plurality of data objects. A maximum dependency distance for the respective dependent data objects in the plurality of dependent data objects is calculated at 804. The respective dependent data objects in the plurality of dependent data objects are grouped at 806 into one or more groups based on their respective maximum dependency distance. A given group of the one or more groups represents a given maximum dependency distance. The one or more groups are executed on in order from smallest to largest of their respective representations of maximum dependency distance at 808. Executing on the one or more groups includes revalidating the data objects of a respective group in parallel at 808*a*.

Figure 8B:
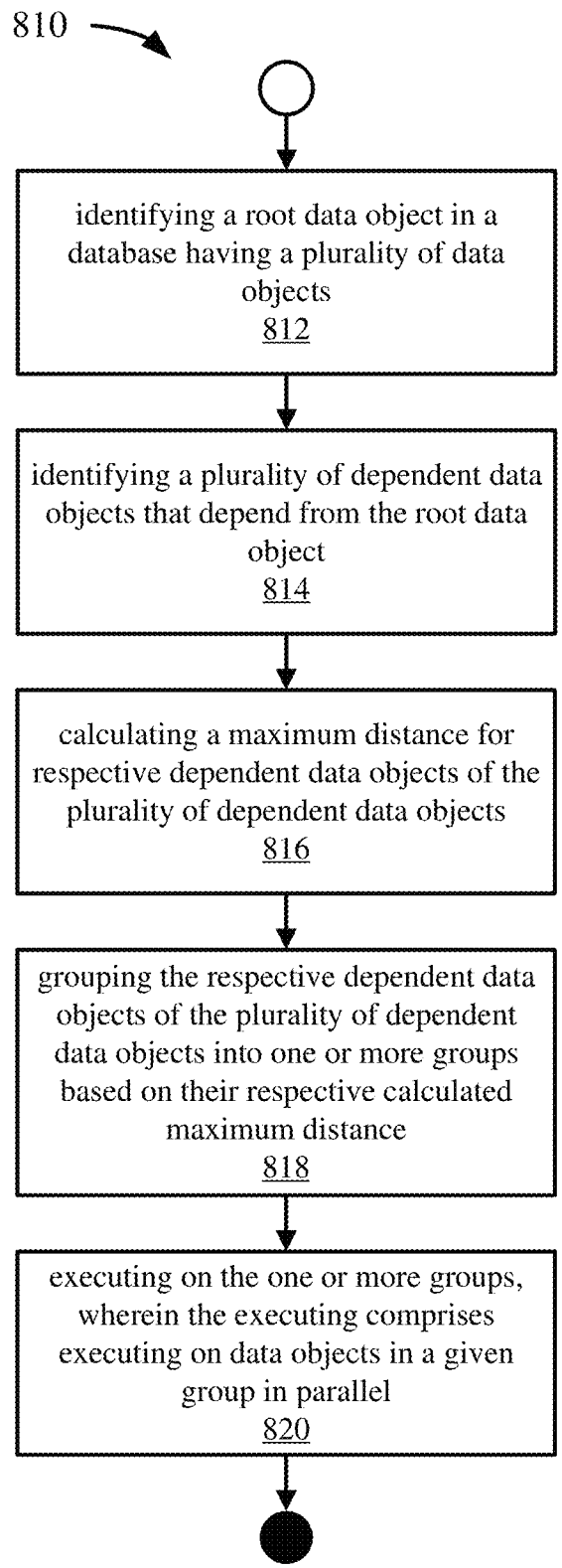
FIG. 8B is a flowchart illustrating another process for parallel database revalidation using distance-based groups.

FIG. 8B illustrates another process 810 for parallel database revalidation using distance-based groups. A root data object, in a database with a plurality of data objects, is identified at 812. A plurality of dependent data objects that depend from the root data object is identified at 814. A maximum distance for the respective dependent data objects of the plurality of dependent data objects is calculated at 816. The respective dependent data objects of the plurality of dependent data objects are grouped into one or more groups, based on their respective calculated maximum distance, at 818. The one or more groups are executed on at 820, where the executing includes executing on data objects in a given group in parallel.

Figure 8C:
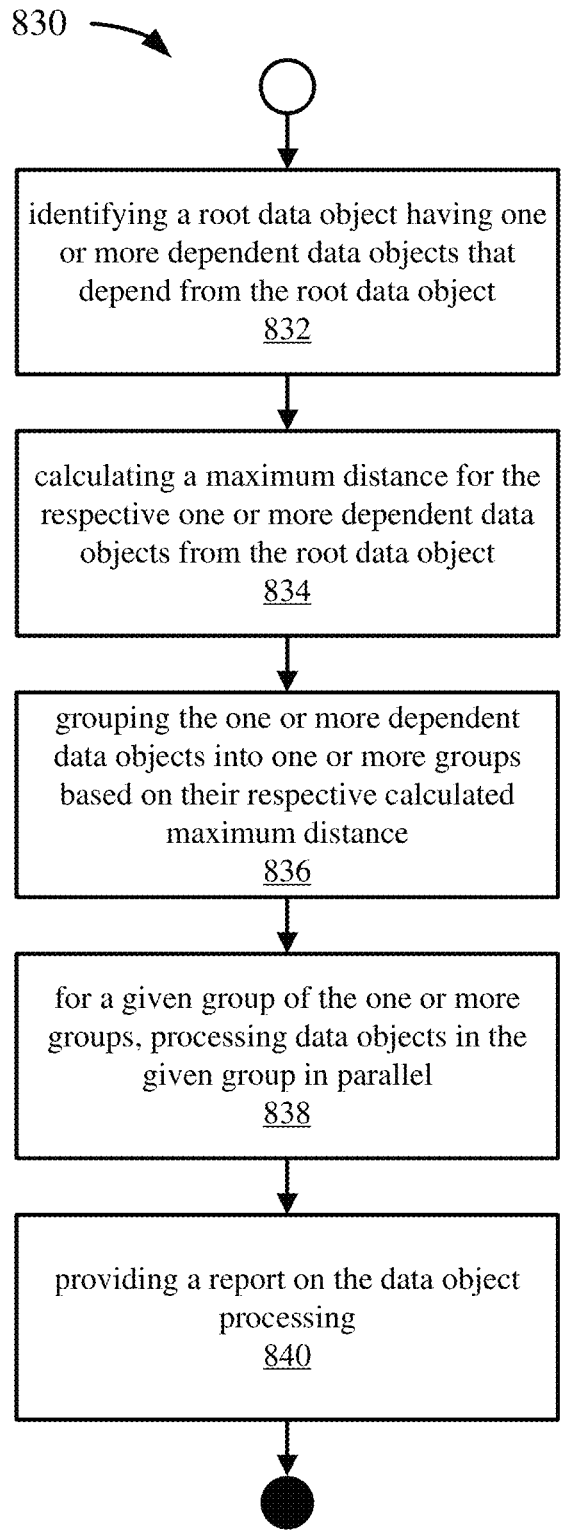
FIG. 8C is a flowchart illustrating a process for parallel data object processing using distance-based groups.

FIG. 8C illustrates a process 830 for parallel data object processing using distance-based groups. A root data object having one or more dependent data objects that depend from the root data object is identified at 832. A maximum distance is calculated for the respective one or more dependent data objects from the root data object at 834. The one or more dependent data objects are grouped at 836 into one or more groups based on their respective calculated maximum distance. For a given group of the one or more groups, data objects in the given group are processed in parallel at 838. A report on the data object processing is provided at 840.

Example 12—Testing Results

Figure 9A:
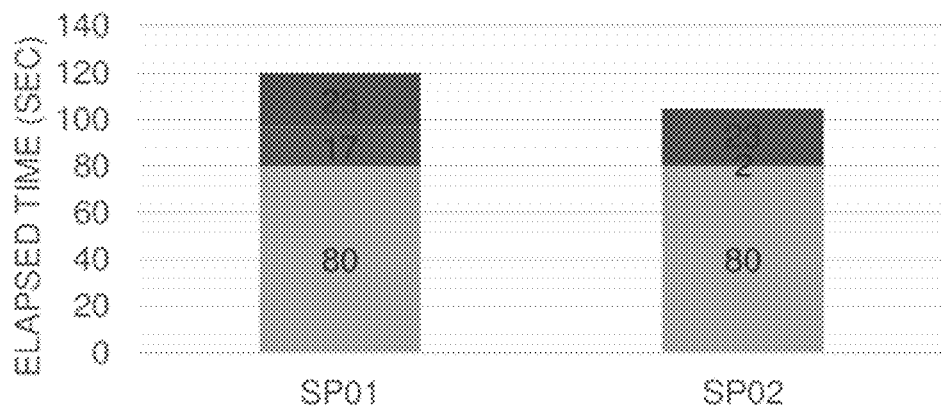
FIG. 9A is a bar chart depicting testing results between methods for revalidation after dropping a view from a database.

FIG. 9A is a bar chart 900 depicting testing results between methods for revalidation after dropping a view from a database. The test was performed on a view (the dropped view) which had 200,000 dependent views. The total number of threads used for the parallel version was 120. Bar 1 shows the total time to revalidate using a non-parallel revalidation process (processing each dependent object in order). The total time for the non-parallel process was 120 seconds, of which 103 seconds were compile, lock, and commit, while the revalidation took 17 seconds. Bar 2 shows the total time to revalidate using a parallel revalidation process as described herein. The total time for the parallel process was 105 seconds, of which 103 seconds were compile, lock, and commit, while the revalidation took 2 seconds. This indicates an improvement from 17 seconds to 2 seconds, or ~88% reduction in revalidation time.

Figure 9B:
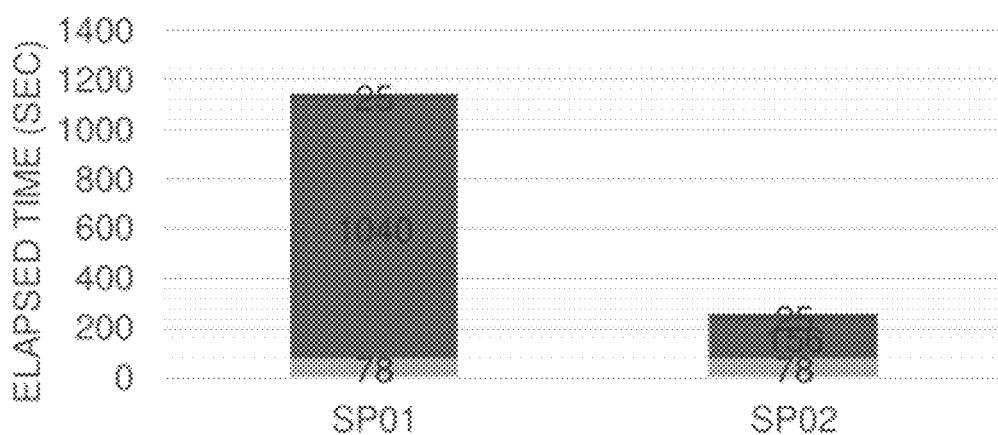
FIG. 9B is a bar chart depicting testing results between methods for revalidation after creating a view in a database.

FIG. 9B is a bar chart 910 depicting testing results between methods for revalidation after creating a view in a database. The test was performed on a view (the created view) which had 200,000 dependent views. The total number of threads used for the parallel version was 120. Bar 1 shows the total time to revalidate using a non-parallel revalidation process (processing each dependent object in order). The total time for the non-parallel process was 1,143 seconds, of which 103 seconds were compile, lock, and commit, while the revalidation took 1,040 seconds. Bar 2 shows the total time to revalidate using a parallel revalidation process as described herein. The total time for the parallel process was 259 seconds, of which 103 seconds were compile, lock, and commit, while the revalidation took 156 seconds. This indicates an improvement from 1,040 seconds to 156 seconds, or ~85% reduction in revalidation time.

Figure 9C:
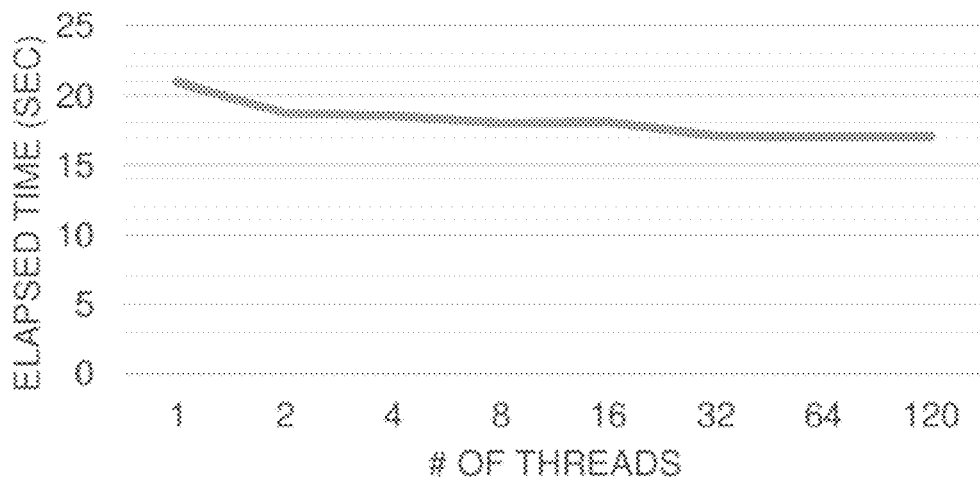
FIG. 9C is a graph depicting testing results for revalidation after dropping a view in a database based on the number of threads used.

FIG. 9C is a graph 920 depicting testing results for revalidation after dropping a view in a database based on the number of threads used. The test was performed on a view (the dropped view) which had 50,000 dependent views. For 1 thread, the total time was about 21 seconds. For 120 threads (the maximum number of threads tested), the total time was about 17 seconds, for a ~19% improvement overall. The total time includes lock, revalidation, and commit. The total lock and commit time was a static 15.51 seconds. Thus, the revalidation time at 1 thread was 5.09 seconds while the revalidation time at 120 threads was 1.09 seconds, for a ~78.6% improvement. This improvement is gained by using more threads revalidating in parallel based on the parallelized revalidation process as described herein.

Figure 9D:
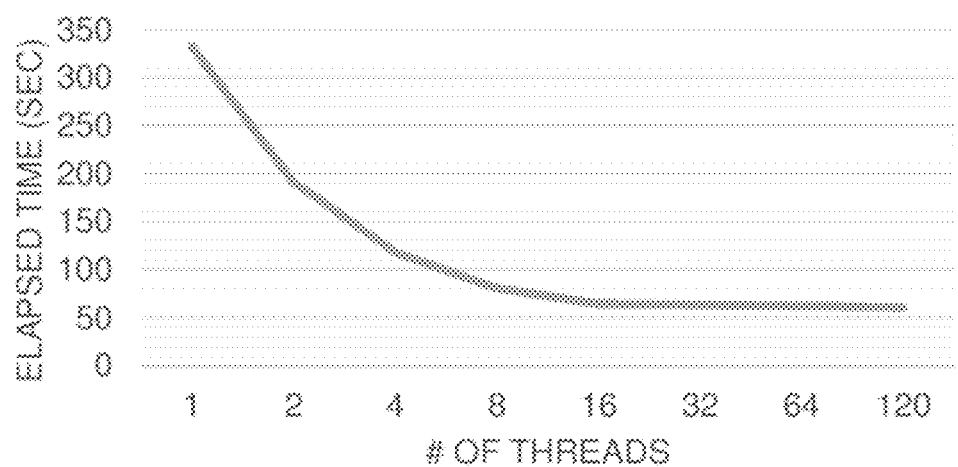
FIG. 9D is a graph depicting testing results for revalidation after creating a view in a database based on the number of threads used.

FIG. 9D is a graph 930 depicting testing results for revalidation after creating a view in a database based on the number of threads used. The test was performed on a view (the created view) which had 50,000 dependent views. For 1 thread, the total time was about 340 seconds. For 120 threads (the maximum number of threads tested), the total time was about 60 seconds, for a ~82.4% improvement overall. The total time includes lock, revalidation, and commit. The total lock and commit time was a static 16.28 seconds. Thus, the revalidation time at 1 thread was 323.72 seconds while the revalidation time at 120 threads was 43.72 seconds, for a ~86.5% improvement. This improvement is gained by using more threads revalidating in parallel based on the parallelized revalidation process as described herein.

Example 13—Computing Systems

Figure 10:
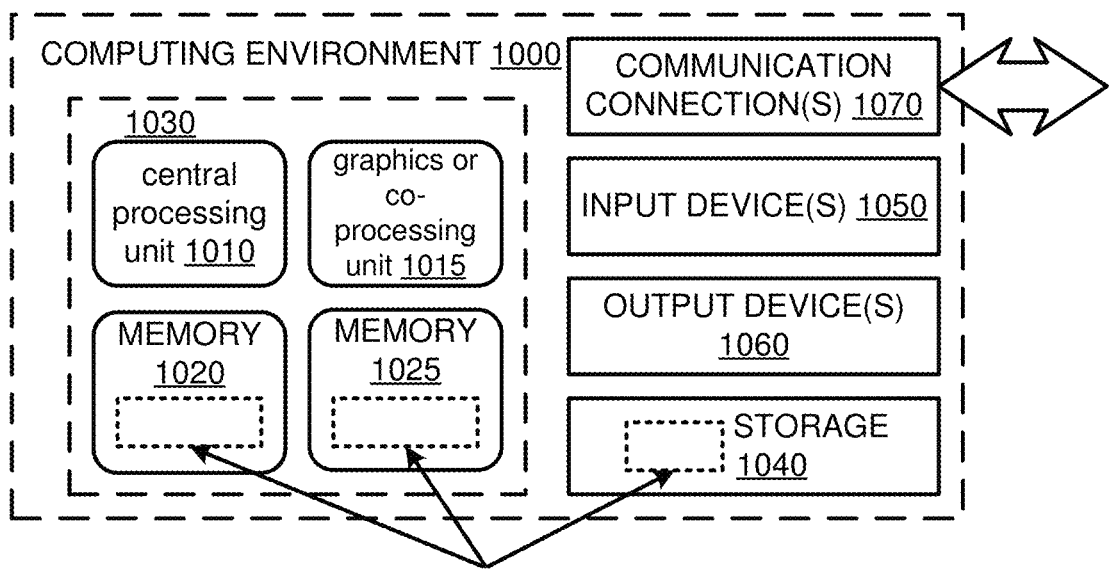
FIG. 10 is a diagram of an example computing system in which described embodiments can be implemented.

FIG. 10 depicts a generalized example of a suitable computing system 1000 in which the described innovations may be implemented. The computing system 1000 is not intended to suggest any limitation as to scope of use or functionality of the present disclosure, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing components of the processes of FIG. 2, 3A-B, 4, 5, 6, or 8A-B, or the systems of FIG. 1 or 7A-B. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015. The memory 1020, 1025, may also store settings or settings characteristics, such as for the interrelated data objects in FIG. 1, systems in FIGS. 7A-B, or the metadata or other data calculated in the processes shown in FIG. 2, 3A-B, 4, 5, 6, or 8A-B.

A computing system 1000 may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality.

Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 14—Cloud Computing Environment

Figure 11:
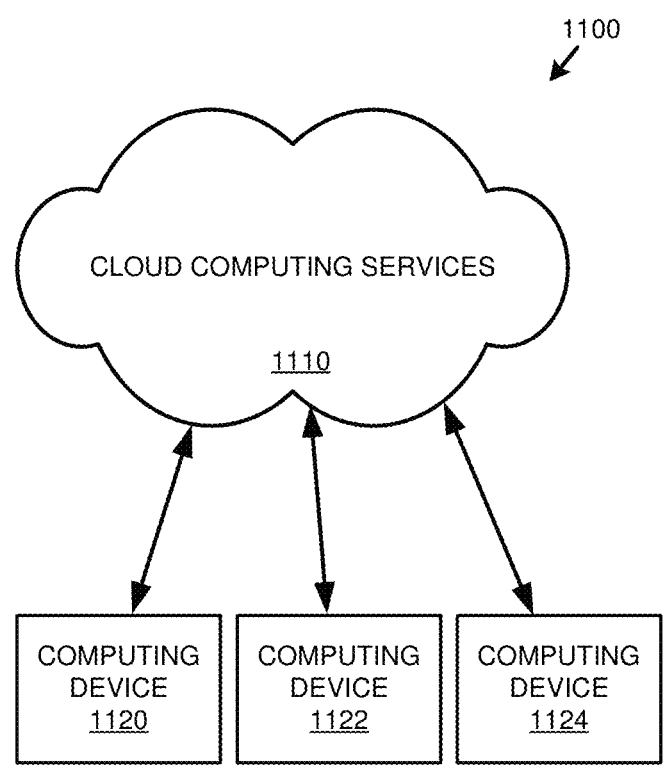
FIG. 11 is an example cloud computing environment that can be used in conjunction with the technologies described herein.

FIG. 11 depicts an example cloud computing environment 1100 in which the described technologies can be implemented. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1210 to perform computing operations (e.g., data processing, data storage, and the like).

Example 15—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 10, computer-readable storage media include memory 1020 and 1025, and storage 1040. The term computer-readable storage media does not include signals and carrier waves. In addition, the term computer-readable storage media does not include communication connections (e.g., 1070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
a database having one or more computer-readable media storing a plurality of data objects;
one or more memories;
one or more processing units coupled to the one or more memories; and
one or more computer readable storage media storing instructions that, when executed, cause the computing system to perform operations comprising:
receiving a change to a first data object of the plurality of data objects, the plurality of data objects comprising one or more database tables or one or more database views, wherein the first data object has a plurality of dependent data objects in the plurality of data objects;
calculating a maximum dependency distance for respective dependent data objects in the plurality of dependent data objects, wherein (1) a dependency distance is a number of data objects of the plurality of data objects in a given dependency path between the first data object and a given dependent data object of the plurality of dependent data objects, (2) at least one dependent data object of the plurality of dependent data objects has multiple paths to the first data object, at least two of the multiple paths having different path lengths, and (3) calculating a maximum dependency distance comprises, for a dependent data object of the plurality of dependent data objects having multiple paths of different path lengths to the first data object, selecting a path of the multiple paths having a largest dependency distance as the maximum dependency distance for the dependent data object, and wherein the calculating a maximum dependency distance comprises:
traversing the plurality of dependent data objects;
determining that a first dependent data object of the plurality of dependent data objects has already been traversed;
determining a current distance between the first dependent data object and the first data object;
determining that a distance, determined during a prior traversal of the first dependent data object, between the first data object and the first dependent data object is less than the current distance determined for the first dependent data object; and
setting the distance to the current distance;
grouping the respective dependent data objects in the plurality of dependent data objects into a plurality of groups based on their respective maximum dependency distance, wherein a given group of the plurality of groups represents a given maximum dependency distance, at least one group of the plurality of groups comprising multiple dependent data objects of the plurality of dependent data objects; and
executing on the plurality of groups in order from smallest to largest of their respective representations of maximum dependency distance, wherein the executing comprises revalidating in parallel dependent data objects in a respective group being executed.

2. The computing system of claim 1, wherein the plurality of data objects comprises one or more database tables and one or more database views.

3. The computing system of claim 1, wherein one or more dependent data objects of the plurality of data objects are indirectly dependent on the first data object.

4. The computing system of claim 1, wherein calculating the maximum dependency distance comprises depth-first traversal of the plurality of dependent data objects.

5. The computing system of claim 1, wherein revalidating comprises testing a given dependent data object's one or more parent objects for validity.

6. The computing system of claim 1, wherein revalidating comprises provides a revalidated dependent data object, the operations further comprising:
setting a validity flag for the revalidated dependent data object.

7. The computing system of claim 1, wherein the first data object is independent of other data objects of the plurality of data objects.

8. One or more non-transitory computer-readable storage media storing computer-executable instructions that, when executed by a computing system, cause the computing system to perform operations comprising:
identifying a root data object in a database having a plurality of data objects, the plurality of data objects comprising one or more database tables or one or more database views;
identifying a plurality of dependent data objects that depend from the root data object;
calculating a maximum distance for respective dependent data objects of the plurality of dependent data objects based on distances for respective dependent data objects, wherein (1) a distance is a number of data objects of the plurality of data objects in a given dependency path between the root data object and a given dependent data object of the plurality of dependent data objects, (2) at least one dependent data object of the plurality of dependent data objects has multiple paths to the root data object, at least two of the multiple paths having different path lengths, and (3) calculating a maximum distance comprises, for a dependent data object of the plurality of dependent data objects having multiple paths of different path lengths to the root data object, selecting a path of the multiple paths having a largest dependency distance as the maximum distance for the dependent data object having multiple paths of different path lengths to the root object, and wherein the calculating a maximum dependency distance comprises:
traversing the plurality of dependent data objects;
determining that a first dependent data object of the plurality of dependent data objects has already been traversed;
determining a current distance between the first dependent data object and the first data object;
determining that a distance, determined during a prior traversal of the first dependent data object, between the first data object and the first dependent data object is less than the current distance determined for the first dependent data object and setting the distance to the current distance;
grouping the respective dependent data objects of the plurality of dependent data objects into a plurality of groups based on their respective calculated maximum distance, at least one group of the plurality of groups comprising multiple dependent data objects of the plurality of dependent data objects; and
executing on the plurality of groups, wherein the executing comprises executing on dependent data objects in a given group of the plurality of groups in parallel.

9. The one or more non-transitory computer-readable storage media of claim 8, wherein the plurality of data objects comprises one or more database tables and one or more database views.

10. The one or more non-transitory computer-readable storage media of claim 8, wherein calculating the maximum distance comprises depth-first traversal of the plurality of dependent data objects.

11. The one or more non-transitory computer-readable storage media of claim 8, wherein the plurality of groups are executed in ascending order of their respective calculated maximum distance.

12. The one or more non-transitory computer-readable storage media of claim 8, wherein executing on dependent data objects in a given group of the plurality of groups comprises revalidating the dependent data objects in a given group of the plurality of groups.

13. The one or more non-transitory computer-readable storage media of claim 12, wherein revalidating comprises testing a given dependent data object's one or more parent objects for validity.

14. The one or more non-transitory computer-readable storage media of claim 12, wherein revalidating comprises setting a validity flag for a revalidated data object.

15. A method, implemented in a computing system comprising one or more hardware processors and at least one memory coupled to the one or more hardware processors, comprising:
identifying a root data object having a plurality of dependent data objects that depend from the root data object, the plurality of dependent data objects comprising one or more database tables or one or more database views;
calculating a maximum distance for respective dependent data objects of the plurality of dependent data objects from the root data object based on distances for respective dependent data objects, wherein (1) a distance is a number of dependent data objects of the plurality of dependent data objects in a given dependency path between the root data object and a given dependent data object of the plurality of dependent data objects, (2) at least one dependent data object of the plurality of dependent data objects has multiple paths to the root data object, at least two of the multiple paths having different path lengths, and (3) calculating a maximum distance comprises, for a dependent data object of the plurality of dependent data objects having multiple paths of different path lengths to the root data object, selecting a path of the multiple paths having a largest dependency distance as the maximum distance for the dependent data object of the plurality of dependent data objects having multiple paths of different path lengths to the root data object, and wherein the calculating a maximum dependency distance comprises:
traversing the plurality of dependent data objects;
determining that a first dependent data object of the plurality of dependent data objects has already been traversed;
determining a current distance between the first dependent data object and the first data object;
determining that a distance, determined during a prior traversal of the first dependent data object, between the first data object and the first dependent data object is less than the current distance determined for the first dependent data object; and
setting the distance to the current distance;
grouping the plurality of dependent data objects into a plurality of groups based on their respective calculated maximum distance, at least one group of the plurality of groups comprising multiple dependent data objects of the plurality of dependent data objects; and
for a given group of the plurality of groups, processing dependent data objects in the given group in parallel.

16. The method of claim 15, wherein calculating the maximum distance comprises depth-first traversal of the plurality of dependent data objects.

17. The method of claim 15, wherein the plurality of groups are processed in ascending order of their respective calculated maximum distance.

18. The method of claim 15, wherein processing dependent data objects in the given group in parallel comprises setting an indicator to indicate results of the processing.

19. The method of claim 15, further comprising:
allocating one or more computing resources to a given group of the plurality of groups for processing separate from resources allocated to other groups of the plurality of groups.

20. The method of claim 15, wherein processing dependent data objects in a given group of the plurality of groups comprises revalidating the dependent data objects in a given group of the plurality of groups to provided revalidated dependent data objects; and
setting validity flags for the revalidated dependent data objects.

* * * * *